(12) United States Patent
Watanabe et al.

(10) Patent No.: US 6,333,480 B1
(45) Date of Patent: Dec. 25, 2001

(54) WIRE ELECTRIC DISCHARGE MACHINING APPARATUS

(75) Inventors: Koutarou Watanabe; Toshio Moro, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/467,248

(22) Filed: Dec. 20, 1999

Related U.S. Application Data

(63) Continuation of application No. PCT/JP97/02186, filed on Jun. 26, 1997.

(51) Int. Cl.[7] .................................................. B23H 1/00
(52) U.S. Cl. ..................................... 219/69.12; 219/69.17
(58) Field of Search ............................. 219/69.11, 69.12, 219/69.16, 69.17; 204/224

(56) References Cited

U.S. PATENT DOCUMENTS

| | | | |
|---|---|---|---|
| 3,969,601 | * | 7/1976 | Rocklin . |
| 4,332,995 | * | 6/1982 | Ito et al. . |
| 4,335,436 | * | 6/1982 | Inoue . |
| 4,631,382 | * | 12/1986 | Fukunaga et al. . |
| 4,700,039 | * | 10/1987 | Konno et al. . |
| 4,745,253 | * | 5/1988 | Girardin . |
| 5,028,757 | * | 7/1991 | Aramaki et al. . |
| 5,070,224 | * | 12/1991 | Topfer et al. . |
| 5,243,165 | * | 9/1993 | Hosaka . |
| 5,302,796 | * | 4/1994 | Kuriki . |
| 5,556,551 | * | 9/1996 | Matsushima et al. . |
| 5,841,091 | * | 11/1998 | Furukawa et al. . |
| 5,897,791 | * | 4/1999 | Hayakawa . |

FOREIGN PATENT DOCUMENTS

| Sho | | |
|---|---|---|
| 62-213923 | 9/1987 | (JP) . |
| 6-226540 | 8/1994 | (JP) . |
| 8-99225 | 4/1996 | (JP) . |

* cited by examiner

*Primary Examiner*—Tom Dunn
*Assistant Examiner*—Colleen Cooke
(74) *Attorney, Agent, or Firm*—Sughrue, Mion, Zinn, Macpeak & Seas, PLLC

(57) ABSTRACT

In order to improve ease of assembly and machining accuracy of a wire electric discharge machine, the present invention constructs a column and a lower support assembly to be separated, and configures the lower support assembly to have a structure integrally composed of a proximal portion having the same sectional shape as a sectional shape of the column, and a central projecting portion that projects from a center of a bottom surface of the proximal portion to support a lower arm. Furthermore, the lower arm is attached to the central projecting portion of the lower support assembly, while a Y-axis guide guided by a Y-axis guide rail of a Y-axis guiding mechanism, for example, is attached to the bottom surface of the proximal portion of the lower support assembly. Then the proximal portion and a bottom surface of the column are connected by bolts.

17 Claims, 6 Drawing Sheets

WIRE ELECTRIC DISCHARGE MACHINING APPARATUS

REFERENCE TO RELATED APPLICATION

The present Application is a continuation of International Application No. PCT/JP97/02186, whose international filing date is Jun. 26, 1997, the disclosures of which Application are incorporated by reference therein. The benefit of the filing date of the International Application is respectfully requested.

FIELD OF THE INVENTION

The present invention relates to a wire electric discharge machining apparatus for machining a workpiece by a wire electrode.

BACKGROUND OF THE INVENTION

FIG. 9 shows a basic structure of a conventional wire electric discharge machining apparatus described in, for example, Japanese Unexamined Patent Publication No. 4-304927.

In the drawing, reference numeral 2 denotes a fixing table on which a workpiece is fixed and machined. Reference numeral 3 denotes an X-axis guiding mechanism for moving an object placed thereon in an X-direction in the drawing. Reference numeral 4 denotes a Y-axis guiding mechanism for moving an object placed thereon in a Y-direction in the drawing. Reference numeral 5 denotes a wire electrode functioning as an electrode for machining. Reference numeral 6 denotes an automatic wire feeding device (hereinafter referred to as "AF device") provided with an upper wire guide (not shown) at a distal end thereof. Reference numeral 7 denotes a taper cutting device (hereinafter referred to as "T/C device") that enables angled machining. Reference numeral 8 denotes a Z-axis base for moving the AF device 6, etc. in a Z-direction in the drawing. The foregoing components designated by reference numerals 6 through 8 constitute an upper support assembly. Reference numeral 9 denotes a column supporting the Z-axis base 8. Reference numeral 10 denotes a saddle for fixing the Y-axis guiding mechanism 4. Reference numeral 11 denotes a machine base functioning as a base for supporting the entire structure. Reference numeral 12 denotes a lower arm for collecting the wire electrode 5, which has finished machining a workpiece, via a lower wire guide (not shown) provided at a distal end thereof. Reference numeral 13 denotes a machining tank filled with a machining solution to perform machining therein. Reference numeral 14 denotes a lower support assembly to be discussed hereinafter.

FIG. 10 and FIG. 11 show details of a section where the column 9 of the conventional wire electric discharge machining apparatus shown in FIG. 9 is mounted.

In the drawings, reference numeral 4a denotes a guide rail of the Y-axis guiding mechanism 4. Reference numeral 4b denotes a Y-axis guide of the Y-axis guiding mechanism 4 guided by the guide rail 4a. Reference numeral 14 denotes a lower support assembly to which the lower arm 12 is fixed. Reference numeral 15 denotes a bolt for fixing the column 9 and the lower support assembly 14. As is obvious from FIG. 11, the Y-axis guides 4b of the Y-axis guiding mechanism 4 are directly provided at the bottom of the column 9.

However, in the conventional wire electric discharge machining apparatus configured as set forth above, the Y-axis guides 4b of the Y-axis guiding mechanism 4 on which the column 9 and the lower support assembly 14 are mounted and which guides movement in the Y-direction have been directly attached to the column 9 as shown in FIG. 10 and FIG. 11, and they have been installed in a structure separate from the lower support assembly 14 that supports the wire electrode 5 for machining a workpiece. This has been posing a problem in that it is extremely difficult to obtain squareness between the lower support assembly 14 and the lower arm 12 and the mounting surface of the Y-axis guiding mechanism 4 in an assembly process.

Furthermore, in the conventional wire electric discharge machining apparatus, since the column 9 and the lower support assembly 14 have been separated as illustrated in FIG. 10 and FIG. 11, there is no structure for supporting the lower support assembly 14; therefore, in an assembly process, the lower support assembly 14 must be first fixed to the column 9 by the bolt 15, then the lower arm 12 and the Y-axis guides 4b must be installed. Hence, the lower support assembly 14 cannot be independently installed, leading to poor assemblability and low work efficiency. On the other hand, if the components disposed from the column 9 to the lower support assembly 14 are integrated, there has also been a problem that it is difficult to machine it because the structural member becomes excessively large.

SUMMARY OF THE INVENTION

Accordingly, the present invention has been made with a view toward solving the problems, and it is an object thereof to provide a wire electric discharge machining apparatus which permits squareness between a lower support assembly and a lower arm and a mounting surface of a Y-axis guiding mechanism to be easily obtained in assembly process, and which also permits high work efficiency.

To this end, according to an aspect of the present invention, there is provided a wire electric discharge machining apparatus having: a fixing table on which a workpiece to be machined by a wire electrode is rested; an upper support assembly for supporting an upper wire guide that guides an upper portion of the wire electrode; a lower arm provided, at a distal end thereof, with a lower wire guide that guides a lower portion of the wire electrode; a lower support assembly to which the lower arm is fixed; a column for coupling the upper support assembly and the lower support assembly; and a horizontal guiding mechanism which as a guide rail and a guide guided by the guide rail and which horizontally moves the upper support assembly, the lower support assembly, and the column; wherein the guide rail or the guide of the horizontal guiding mechanism is fixed to the lower support assembly.

According to another aspect of the present invention, the lower arm and the lower support assembly are so made that they are detachably connected to each other.

According to still another aspect of the present invention, the horizontal guiding mechanism comprises an X-axis guiding mechanism for guiding movement in an X-axis direction and a Y-axis guiding mechanism for guiding movement in a Y-axis direction, and wherein either the X-axis guiding mechanism or the Y-axis guiding mechanism is disposed in a closed loop formed by the upper support assembly, the column, the lower support assembly, the lower arm, and the wire electrode.

According to a further aspect of the present invention, the horizontal guiding mechanism comprises an X-axis guiding mechanism for guiding movement in an X-axis direction and a Y-axis guiding mechanism for guiding movement in a Y-axis direction, and wherein the fixing table and the lower support assembly are disposed between the X-axis guiding mechanism and the Y-axis guiding mechanism.

According to yet another aspect of the present invention, the horizontal guiding mechanism comprises an X-axis guiding mechanism for guiding movement in an X-axis direction and a Y-axis guiding mechanism for guiding movement in a Y-axis direction, and wherein one of the X-axis guiding mechanism and the Y-axis guiding mechanism is positioned under the fixing table, and wherein the other is positioned under the column.

DETAILED DESCRIPTION OF THE PREFERRED EMBODIMENTS (1) First Embodiment

A first embodiment of a wire electric discharge machining apparatus in accordance with the present invention will now be described with reference to the accompanying drawings.

Figure 1:
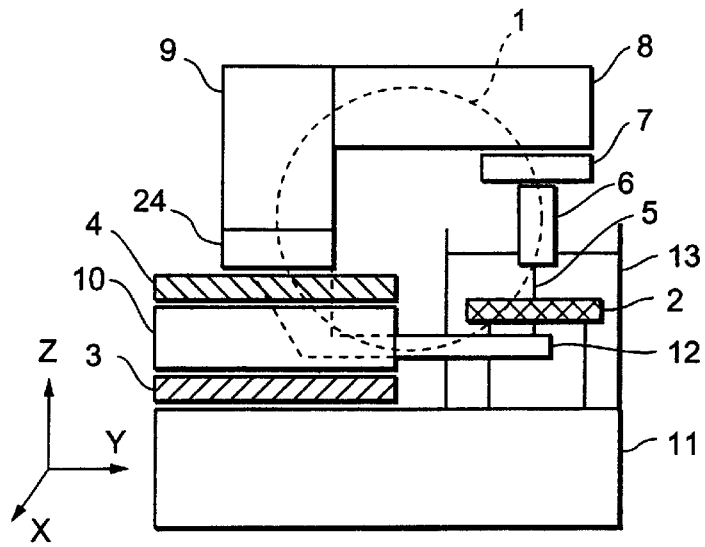
FIG. 1 is a configuration diagram showing a structure of a first embodiment of a wire electric discharge machining apparatus in accordance with the present invention.

FIG. 1 shows a basic structure of the first embodiment of a wire electric discharge machining apparatus in accordance with the present invention.

In the drawing, reference numeral 2 denotes a fixing table on which a workpiece is fixed and machined. Reference numeral 3 denotes an X-axis guiding mechanism for moving an object placed thereon in an X-direction in the drawing. Reference numeral 4 denotes a Y-axis guiding mechanism that has Y-axis guides 4b and Y-axis guide rails 4a which will be discussed later and which move an object placed thereon in a Y-direction in the drawing. Reference numeral 5 denotes a wire electrode functioning as an electrode for machining. Reference numeral 6 denotes an automatic wire feeding device (hereinafter referred to as "AF device") provided with an upper wire guide (not shown) at a distal end thereof. Reference numeral 7 denotes a taper cutting device (hereinafter referred to as "T/C device") that enables angled machining. Reference numeral 8 denotes a Z-axis base for moving the AF device 6, etc. in a Z-direction in the drawing. The foregoing components designated by reference numerals 6 through 8 constitute an upper support assembly. Reference numeral 9 denotes a column supporting the Z-axis base 8. Reference numeral 10 denotes a saddle for fixing the X-axis and Y-axis guiding mechanisms 3 and 4. Reference numeral 11 denotes a machine base functioning as a base for supporting the entire structure. Reference numeral 12 denotes a lower arm for collecting the wire electrode 5, which has finished machining a workpiece, via a lower wire guide (not shown) provided at a distal end thereof. Reference numeral 13 denotes a machining tank filled with a machining solution to perform machining therein. Reference numeral 24 denotes a lower support assembly which will be described in detail in the next FIG. 2, on which the column 9 is rested, and which is provided such that it may be moved in the Y-axis direction by the Y-axis guiding mechanism 4. Reference numeral 1 in the drawing denotes a so-called rigid coupling loop, which is a closed circuit formed by the wire electrode 5, the lower arm 12, the lower support assembly 24, the column 9, the z-axis base 8, the T/C device 7 and the AF device 6.

Now, an assembly procedure of the wire electric discharge machining apparatus of the first embodiment will be described. First, the X-axis guiding mechanism 3, the saddle 10, and the Y-axis guiding mechanism 4 are disposed in this order from the bottom at the left side, in the drawing, on the machine base 11. The order of the X-axis guiding mechanism 3 and the Y-axis guiding mechanism 4 may be reversed.

Figure 4:
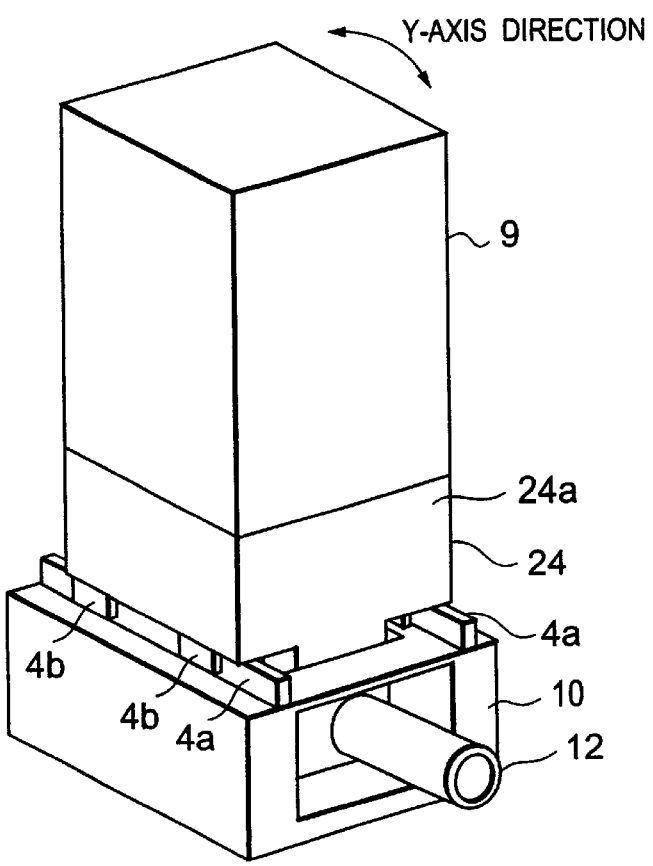
FIG. 4 is a configuration diagram showing a state wherein the lower support assembly 24 and the saddle 10 of the wire electric discharge machining apparatus in accordance with the present invention have been installed.
Figure 5:
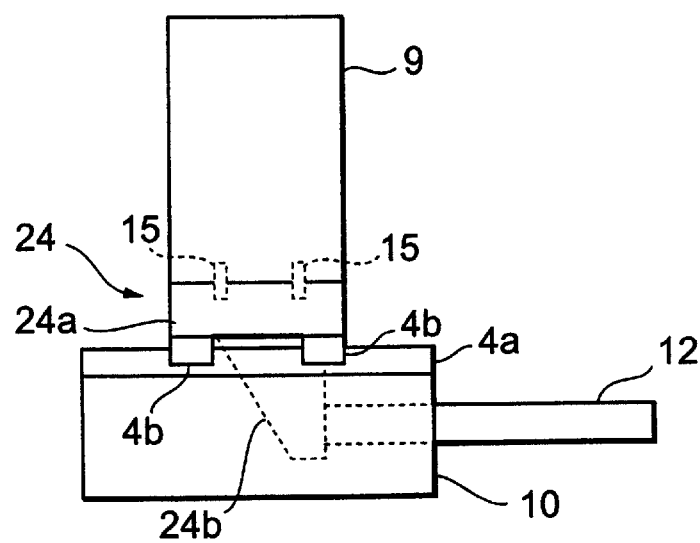
FIG. 5 is a side view of a mounting portion of the column 9 and the lower support assembly 24 of the wire electric discharge machining apparatus in accordance with the present invention.
Figure 6:
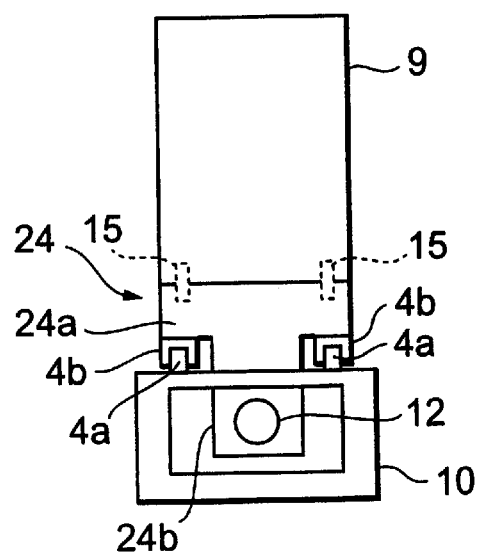
FIG. 6 is a front view of the mounting portion of the column 9 and the lower support assembly 24 of the wire electric discharge machining apparatus in accordance with the present invention.

Next, the lower support assembly 24, to which the Y-axis guide 4b guided by the Y-axis guide rail 4a and the lower arm 12 are directly fixed, is provided above the saddle 10, and the column 9, which is separated from the lower support assembly 24, is installed on the lower support assembly 24 such that the lower arm 12 and the saddle 10 do not interfere with each other as shown in FIG. 4 through FIG. 6 to be discussed hereinafter.

On the other hand, at the right side in the drawing on the machine base 11 where the X-axis guiding mechanism 3 is not placed, a machining tank 13 in which the fixing table 2 has been disposed and fixed is first disposed. At this time, an arrangement is made such that the vertical heights of the fixing table 2 and the lower arm 12 are between the X-axis guiding mechanism 3 and the Y-axis guiding mechanism 4.

Figure 2:
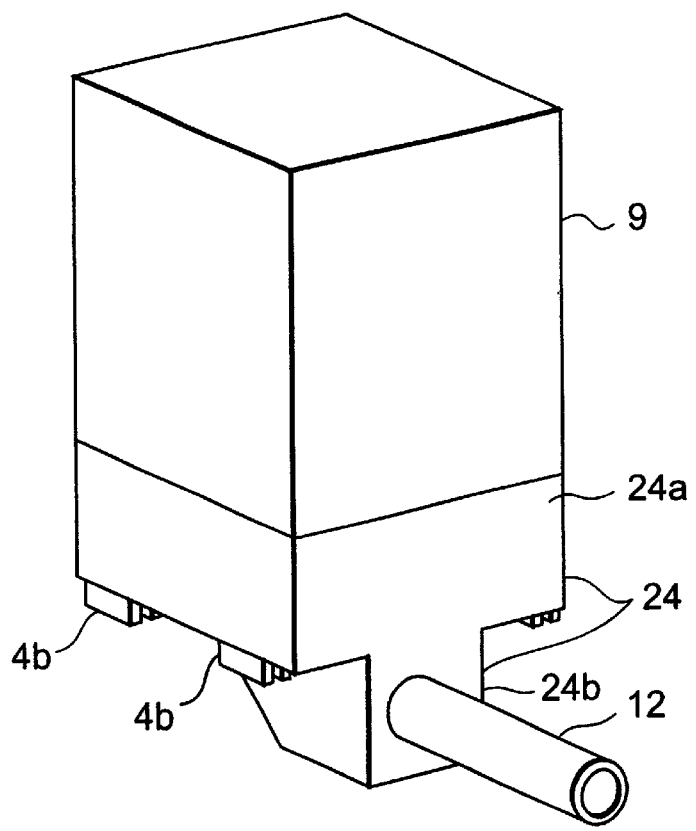
FIG. 2 is a configuration diagram illustrating a relationship between a lower support assembly 24, a column 9, and a lower arm 12 of the wire electric discharge machining apparatus in accordance with the present invention.

FIG. 2 shows a structure of the lower support assembly 24, etc. of the wire electric discharge machining apparatus in accordance with the present invention.

As shown in the drawing, the lower support assembly 24 is formed of a proximal portion 24a having the same sectional shape as the sectional shape of the column 9, and a central projecting portion 24b that projects from a center of the bottom surface of the proximal portion 24a to support the lower arm 12, the proximal portion 24a and the central projecting portion 24b being formed integrally. The column 9 is fixed by a bolt 15 (shown in FIG. 5 and FIG. 6) on the proximal portion 24a of the lower support assembly 24, while the lower arm 12 is fixed to the central projecting portion 24b of the lower support assembly 24. Furthermore, the Y-axis guides 4b guided by the Y-axis guide rails 4a of the Y-axis guiding mechanism 4 are provided on the bottom surface of the proximal portion 24a of the lower support assembly 24.

Figure 3:
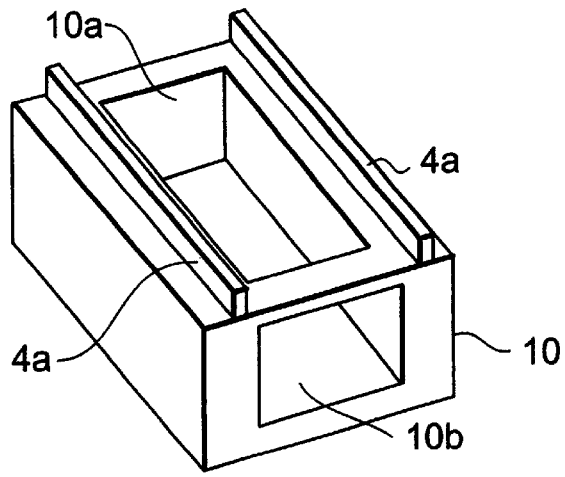
FIG. 3 is a configuration diagram showing a structure of a saddle 10 of the wire electric discharge machining apparatus in accordance with the present invention.

FIG. 3 shows a structure of the saddle 10 of the wire electric discharge machining apparatus in accordance with the present invention.

As shown in the drawing, a top surface of the saddle 10 is provided with a cavity 10a for the central projecting portion 24b of the lower support assembly 24 to freely move in the Y-axis direction, while a front surface of the saddle 10 is provided with an opening 10b for the lower arm 12 provided on the central projecting portion 24b of the lower support assembly 24 to protrude under the wire electrode 5.

FIG. 4 shows a state wherein the lower support assembly 24 of the wire electric discharge machining apparatus in accordance with the present invention has been installed in the saddle 10.

As shown in the drawing, the central projecting portion 24b of the lower support assembly 24 is inserted in the cavity 10a of the top surface of the saddle 10 such that it is free to move in the Y-axis direction, and the lower arm 12 juts out under the wire electrode 5 through the opening 10b of the front surface of the saddle 10.

FIG. 5 and FIG. 6 respectively show a side view and a front view of how the column 9 and the lower support assembly 24 are connected, during the lower support assembly 24 having been installed in the saddle 10.

As shown in the drawing, the column 9 and the lower support assembly 24 are coupled by connecting the bottom surface of the column 9 and the top surface of the proximal portion 24a of the lower support assembly 24 by a plurality of (e.g. four in this drawing) bolts 15.

Since the lower support assembly 24 has the integrated structure composed of the proximal portion 24a, which has the same sectional shape as the sectional shape of the column 9, and the central projecting portion 24b, the proximal portion 24a can provide the structure that supports the entire lower support assembly 24, when assembling these members.

Thus, for example, the top surface of the proximal portion 24a of the lower support assembly 24 is placed on an assembly board (not shown) or the proximal portion 24a is fixed or the like to install the Y-axis guides 4b of the Y-axis guiding mechanism 4 and the lower arm 12 onto the lower support assembly 24, and thereafter, the column 9 supporting the Z-axis base 8, etc. is rested on the top surface of the lower support assembly 24, then the lower support assembly 24 and the column 9 are coupled by the bolts 15.

Thus, according to the first embodiment, since the column 9 and the lower support assembly 24 on which the lower arm 12 is provided are constructed to be separate, allowing the size of the column 9 and the lower support assembly 24 to be reduced, so that they can be handled more easily during assembly process, consequently permitting easy machining by NC or the like. Furthermore, since the proximal portion 24a having the same sectional shape as the sectional shape of the column 9 provides the structure that supports the lower support assembly 24, the lower support assembly 24 can be handled in a discrete form during assembly work such as installation of the Y-axis guide 4b and the lower arm 12.

In addition, whereas the assembly sequence has been fixed when the column 9 and the lower support assembly 14 were integrally constructed, the split structure allows the components to be separately assembled on different lines at a time. Thus, assemblability and work efficiency can be improved, and manufacturing cost can be reduced owing to improved workability.

Moreover, since the lower arm 12 and the lower support assembly 24 are also configured to be detachably connected to each other, the size of the lower support assembly 24 can be reduced, so that it can be handled more easily and can be machined easily by NC or the like. In addition, whereas the assembly sequence has been fixed when the column 9 and the lower support assembly 14 were integrally constructed, the structure allows the components to be separately assembled on different lines at a time. Thus, manufacturing cost can be reduced owing to improved workability.

Figures 9, 10:
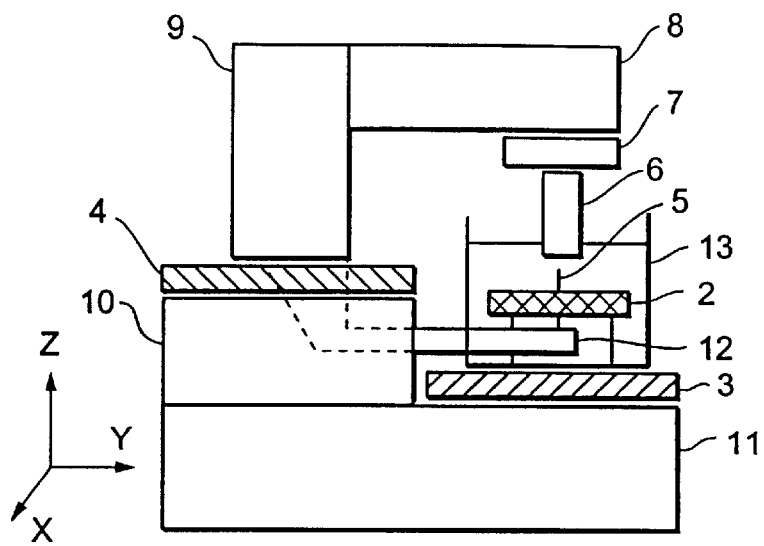
FIG. 9 is a configuration diagram showing a basic structure of a conventional wire electric discharge machining apparatus.
FIG. 10 is a side view of a mounting portion of a column 9 and a lower support assembly 14 of the conventional wire electric discharge machining apparatus.
Figure 11:
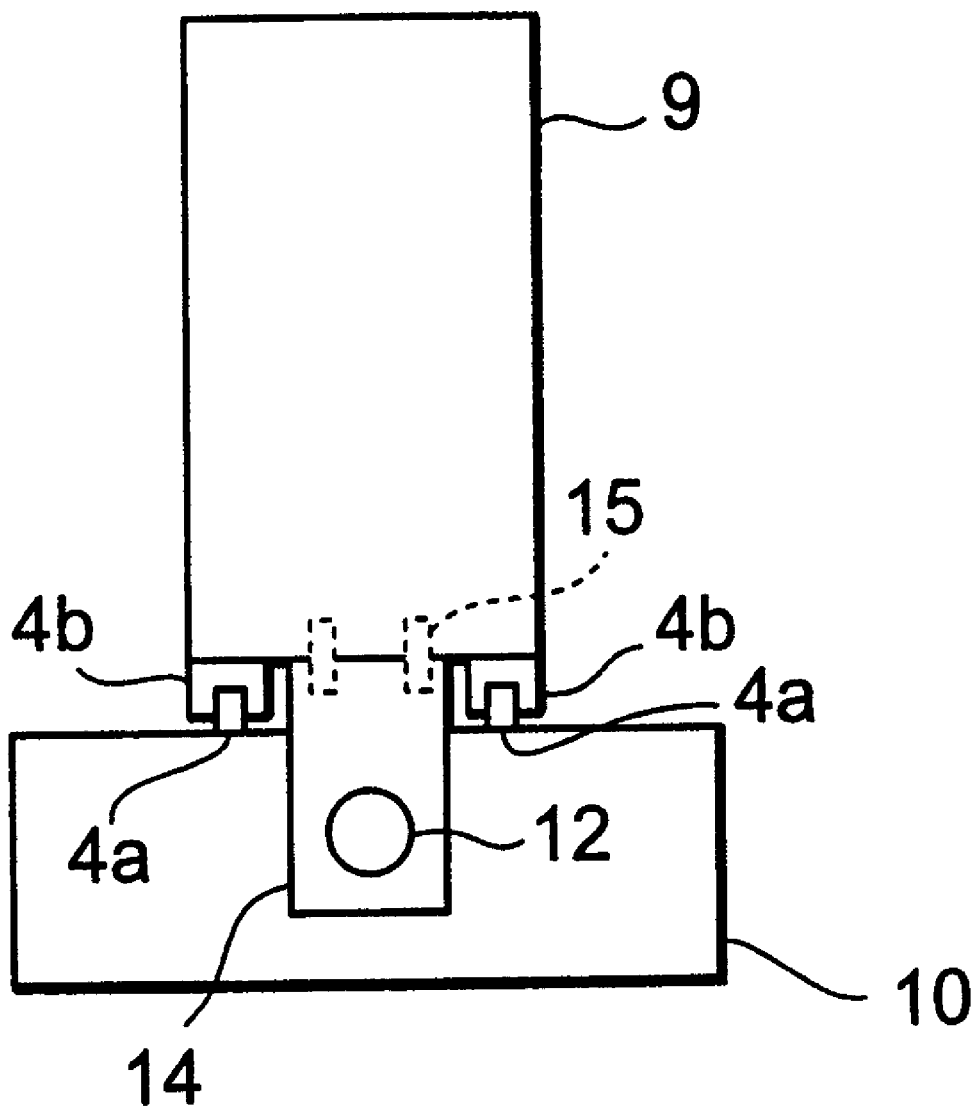
FIG. 11 is a front view of a mounting portion of a column 9 and a lower support assembly 14 of the conventional wire electric discharge machining apparatus.

Furthermore, in the conventional configuration, as shown in FIG. 10 and FIG. 11, the Y-axis guides 4b and the lower arm 12 are fixed to separate members, namely, the Y-axis guide 4b is fixed to the column 9 and the lower arm 12 is fixed to the lower support assembly 14, then the column 9 and the lower support assembly 14 are connected by the bolts 15. Hence, the accuracy of straightness between the Y-axis guide 4b and the lower arm 12 that must be horizontally fixed with respect to the moving direction has been also required in assembling the column 9 and the lower support assembly 14. However, in the first embodiment, since both the Y-axis guide 4b and the lower arm 12 are directly fixed to the lower support assembly 24, it is no longer required to achieve an accurate straightness between the Y-axis guide 4b and the lower arm 12 when connecting the column 9 and the lower support assembly 24 by the bolts 15, making it easier to straighten the Y-axis guide 4b and the lower arm 12.

Furthermore, the fixing table 2 and the lower support assembly 24 are disposed between the X-axis guiding mechanism 3 and the Y-axis guiding mechanism 4, so that the vertical distance between the X-axis guiding mechanism 3, the Y-axis guiding mechanism 4 and the fixing table 2 is shortened. This arrangement reduces a positioning error and a straightness error or the like due to occurrence of pitching, yawing, etc. As a result, the accuracy of straightness can be further improved, enabling highly accurate machining to be accomplished.

Moreover, as explained above, the order of horizontal guiding mechanisms, namely, the X-axis guiding mechanism 3 and the Y-axis guiding mechanism 4 may be reversed and the guide rail of the horizontal guiding mechanism can be attached to the lower support assembly 24 in place of the guide.

Figure 7:
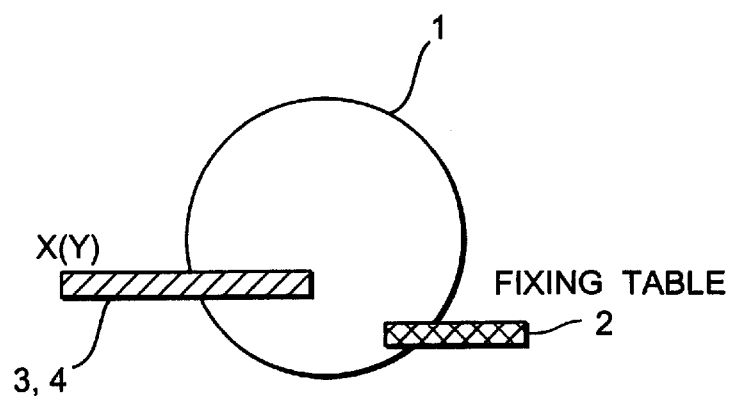
FIG. 7 is a schematic diagram illustrating a relationship between X- and Y-axis guiding mechanisms 3 and 4 and a fixing table 2 in the first embodiment of the present invention.

FIG. 7 shows a relationship between the X- and Y-axis guiding mechanism 3 and 4 and the fixing table 2 in this embodiment.

As shown in the drawing, in this first embodiment, the fixing table 2 and either the X-axis guiding mechanism 3 or the Y-axis guiding mechanism 4 lie at positions where they cross the rigid coupling loop 1 which is a closed loop formed by the upper support assembly, the column 9, the lower support assembly 24, the lower arm 12, and the wire electrode 5.

Therefore, according to the first embodiment, the horizontal distance between the fixing table 2 and the X-axis guiding mechanism 3 or the Y-axis guiding mechanism 4 is shorter, reducing a positioning error and a straightness error or the like due to occurrence of pitching, yawing, etc. Hence, positioning accuracy and the accuracy of straightness can be further improved, enabling highly accurate machining to be accomplished.

(2) Second Embodiment

Figure 8:
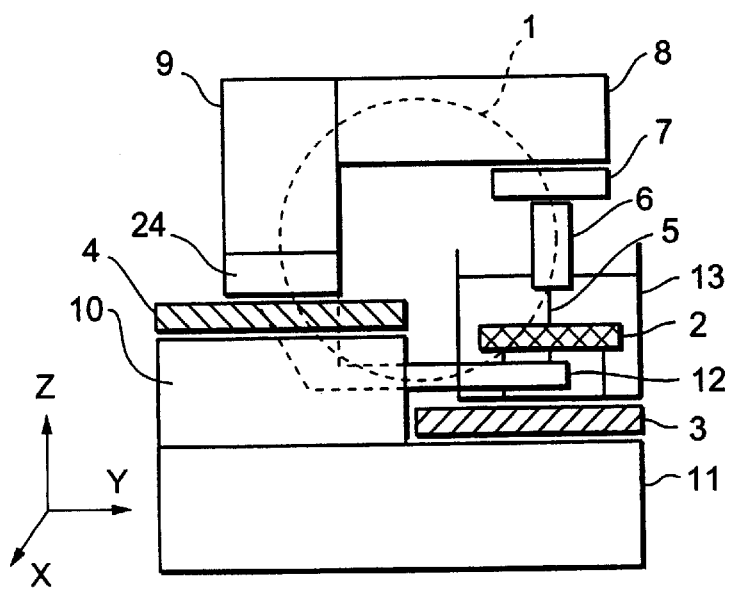
FIG. 8 is a configuration diagram showing a structure of the second embodiment of a wire electric discharge machining apparatus in accordance with the present invention.

FIG. 8 shows a basic structure of a second embodiment of the wire electric discharge machining apparatus in accordance with the present invention.

The wire electric discharge machining apparatus of the second embodiment is characterized in that the structure or the like of a lower support assembly 24 is the same as that of the first embodiment, but an X-axis guiding mechanism 3 is provided under a fixing table 2 rather than under a saddle 10.

More specifically, as shown in FIG. 8, the X-axis guiding mechanism 3 is disposed at top right, in the drawing, of a machine base 11, and the fixing table 2 on which a workpiece is fixed and machined is rested above the X-axis guiding mechanism 3.

On the other hand, the Y-axis guiding mechanism 4 is disposed at top left, in the drawing, of the machine base 11, and the lower support assembly 24 configured in the same manner as that of the first embodiment, wherein the lower support assembly 24 to which the y-axis guide 4b of the Y-axis guiding mechanism 4 and the lower arm 12 are directly fixed, which is separated from the column 9, and which has the same sectional shape as the sectional shape of the column 9, is disposed above the Y-axis guiding mechanism 4.

Furthermore, the column 9 is rested on the lower support assembly 24 via bolts 15 (not shown in FIG. 8) as in the case of the first embodiment, and the lower support assembly 24 and the column 9 are coupled and fixed by the bolts 15. At this time, an arrangement is made such that the vertical heights of the fixing table 2 and the lower arm 12 are between the X-axis guiding mechanism 3 and the Y-axis guiding mechanism 4.

Thus, according to the wire electric discharge machining apparatus of the second embodiment, since the fixing table 2 and the lower arm 12 are disposed between the X-axis guiding mechanism 3 and the Y-axis guiding mechanism 4 in the vertical direction, the accuracy of straightness can be further improved, permitting highly accurate machining.

Furthermore, since one plane of either the X-axis guiding mechanism 3 or the Y-axis guiding mechanism 4 is disposed under the fixing table 2, the necessity of a saddle for fixing the guiding mechanism is obviated, so that a load applied to the guiding mechanisms is reduced accordingly, leading to higher accuracy of straightness. Moreover, since the other guiding mechanism is disposed under the column 9, the vertical length of the column 9 can be reduced, leading to higher rigidity in a bending direction and a reduced shape error in a Y-direction. In addition, the reduced vertical length of the column 9 leads to a reduced surface area of the column 9, making the column 9 less sensitive to changes in the temperature of a machining solution; hence, an increase in a shape error due to a bimetal effect can be suppressed. Moreover, the reduced vertical length of the column 9 means a reduced weight of the structure with a smaller positioning error caused by pitching.

As a result, designing a basic structure of a wire electric discharge machining apparatus in accordance with the present invention enables an optimum design to be achieved by merely changing a structure without increasing a thickness of castings, and also makes it possible to easily reduce weight.

While the invention has been particularly shown and described with reference to a preferred embodiment, it will be understood by those skilled in the art that various changes in form and detail may be made without departing from the spirit and scope of the invention.

What is claimed is:

1. A wire electric discharge machining apparatus comprising:
    a fixing table on which a workpiece to be machined by a wire electrode is rested;
    an upper support assembly for supporting an upper wire guide that guides an upper portion of said wire electrode;
    a lower arm provided with a lower wire guide that guides a lower portion of said wire electrode;
    a lower support assembly to which said lower arm is fixed;
    a column for coupling said upper support assembly and said lower support assembly; and
    a horizontal guiding mechanism which has a guide rail and a guide guided by said guide rail and which horizontally moves said upper support assembly, said lower support assembly, and said column;
    wherein the guide rail or the guide of said horizontal guiding mechanism is fixed to said lower support assembly.

2. A wire electric discharge machining apparatus according to claim 1, wherein said lower arm and said lower support assembly are so made that they are detachably connected to each other.

3. A wire electric discharge machining apparatus according to claim 1, wherein said horizontal guiding mechanism comprises an X-axis guiding mechanism for guiding movement in an X-axis direction and a Y-axis guiding mechanism for guiding movement in a Y-axis direction, and wherein either said X-axis guiding mechanism or said Y-axis guiding mechanism is disposed in a closed loop formed by said upper support assembly, said column, said lower support assembly, said lower arm, and said wire electrode.

4. A wire electric discharge machining apparatus according to claim 2, wherein said horizontal guiding mechanism comprises an X-axis guiding mechanism for guiding movement in an X-axis direction and a Y-axis guiding mechanism for guiding movement in a Y-axis direction, and wherein either said X-axis guiding mechanism or said Y-axis guiding mechanism is disposed in a closed loop formed by said upper support assembly, said column, said lower support assembly, said lower arm, and said wire electrode.

5. A wire electric discharge machining apparatus according to claim 1, wherein said horizontal guiding mechanism comprises an X-axis guiding mechanism for guiding movement in an X-axis direction and a Y-axis guiding mechanism for guiding movement in a Y-axis direction, and wherein said fixing table and said lower support assembly are disposed between said X-axis guiding mechanism and said Y-axis guiding mechanism.

6. A wire electric discharge machining apparatus according to claim 2, wherein said horizontal guiding mechanism comprises an X-axis guiding mechanism for guiding movement in an X-axis direction and a Y-axis guiding mechanism for guiding movement in a Y-axis direction, and wherein said fixing table and said lower support assembly are disposed between said X-axis guiding mechanism and said Y-axis guiding mechanism.

7. A wire electric discharge machining apparatus according to claim 1, wherein said horizontal guiding mechanism comprises an X-axis guiding mechanism for guiding movement in an X-axis direction and a Y-axis guiding mechanism for guiding movement in a Y-axis direction, and wherein one of said X-axis guiding mechanism and said Y-axis guiding mechanism is positioned under said fixing table, and wherein the other is positioned under said column.

8. A wire electric discharge machining apparatus according to claim 2, wherein said horizontal guiding mechanism comprises an X-axis guiding mechanism for guiding movement in an X-axis direction and a Y-axis guiding mechanism for guiding movement in a Y-axis direction, and wherein one of said X-axis guiding mechanism and said Y-axis guiding mechanism is positioned under said fixing table, and wherein the other is positioned under said column.

9. A wire electric discharge machining apparatus according to claim 1, wherein said lower support assembly includes a central projecting portion and a proximal portion closer to said column than said central projecting portion.

10. A wire electric discharge machining apparatus according to claim 9, wherein said proximal portion has a sectional shape being the same as a sectional shape of said column.

11. A wire electric discharge machining apparatus according to claim 9, wherein said lower arm is fixed to said central projecting portion.

12. A wire electric discharge machining apparatus according to claim 9, wherein said guide is fixed to said proximal portion.

13. A wire electric discharge machining apparatus according to claim 9, wherein said guide rail is fixed to said proximal portion.

14. A wire electric discharge machining apparatus according to claim 9, wherein said central projecting portion and said proximal portion are integrally formed.

15. A method of fabricating a wire electric discharge machining apparatus, comprising:
   disposing a first portion of a horizontal guiding mechanism on a machine base, the first portion of the horizontal guiding mechanism being a one of a guide rail or a guide guided by the guide rail;
   providing a lower support assembly above the horizontal guiding mechanism, the lower support assembly having a lower arm and a second portion of the horizontal guiding mechanism fixed thereto, the second portion of the horizontal guiding mechanism being an other one of the guide rail or the guide guided by the guide rail; and
   installing a column on the lower support assembly.

16. The method of fabricating a wire electric discharge machining apparatus according to claim 15, wherein the horizontal guiding mechanism includes an X-axis guiding mechanism and a Y-axis guiding mechanism and further comprising the step of arranging the lower arm and a fixing table between the X-axis guiding mechanism and the Y-axis guiding mechanism.

17. The method of fabricating a wire electric discharge machining apparatus according to claim 15, further comprising assembling the column at a first location and simultaneously assembling the lower support assembly at a second location.

* * * * *